United States Patent Office 3,589,910
Patented June 29, 1971

3,589,910
SYNTHETIC GRANULAR CAVIAR AND A
METHOD OF PREPARING IT
Alexandr Nikolaevich Nesmeyanov, Leninskie Gory, MGU, korpus k, kv. 105; Sergei Vasilievich Rogozhin, Ulitsa Vavilova 55/5, kv. 52; Grigory Lvovich Slonimsky, Ulitsa Chkalova 1/4, kv. 16; Vladimir Borisovich Tolstoguzov, B. polyanka 34, kv. 6; and Vera Alexandrovna Ershova, Staro-Konjushenny pereulok 14, kv. 1, all of Moscow, U.S.S.R.
No Drawing. Filed Mar. 1, 1967, Ser. No. 619,599
Int. Cl. A23j 3/00
U.S. Cl. 99—14
10 Claims

ABSTRACT OF THE DISCLOSURE

A synthetic caviar produced by mixing a solution or a suspension of edible proteins with gelatin, dropping the mixture into a water immiscible liquid to form jelly-like granules and treating the granules with a tanning agent.

The present invention relates to food products and more particularly to granular food products, which closely resemble the natural caviar of sturgeon, salmon and other fish and to a method for their preparation.

There was formerly proposed a method for the preparation of finely divided granular food products as a kind of caviar, using as the chief initial components of the granules, aqueous solutions or suspensions of edible proteins in the form of broths, sauces and ground pastes of ordinary foods such as meat, fish, vegetables, fruits, sea-weeds etc. The method of preparing such products provides for the mixing of the above-mentioned broths, sauces or ground pastes with water soluble alginates and then coagulating them in the form of globules or granules in a solution of calcium chloride (Japanese Pat. No. 15,088, class 34AO).

A disadvantage associated with these products and the methods for preparing them is the use of food products as starting materials, which themselves find wide use, such as salmon. Hence, the above method does not provide for increasing the quantity of food products containing protein which at present are in very short supply throughout the world. Moreover, these products only remotely resemble in organoleptic quality, composition and food value the natural sturgeon or salmon caviar which are among the most valuable of food products.

The object of the present invention is the provision of synthetic granular caviar which closely resembles natural granular caviar of sturgeon, salmon and other fish.

Another object of this invention is the provision of a method of preparing synthetic granular caviar from vegetable and animal foods containing protein which are not used or are little used in their original form.

Still another object of the invention is the provision of a method which makes it possible to use the by-products of the food industry as well as highly valuable but unused or little used low cost proteins from such sources as milk, soya bean, chlorelli, yeast etc.

Among other objects of this invention is the preparation of valuable food products with balanced aminoacid composition, excellent palatability and low cost.

The invention provides also for varying over a wide range the food value, color, taste, storing qualities and the mechanical and physical properties of the granular caviar thus prepared, which contains the necessary proteins, carbohydrates, fats, vitamins and mineral salts required for the nourishment of man and which can be varied to meet the different requirements of various groups of the population and of those who require different corrective diets and have different tastes.

In order to accomplish these objects the granular caviar of the present invention is prepared in such a way that the basic components of the granules are made from aqueous solutions or suspensions of proteins.

According to the invention, the granules contain gelatin and vegetable tanning agents. The latter are located mainly in the surface layer of the granule, which is in the form of a membrane enveloping a protein solution or a protein solution and a suspension.

It is desirable that the granule composition comprise plasticizers, preferably glycerol, and also carbohydrates, preferably starch, dextrin, agar-agar, pectin, either separately or in combination. In addition, the caviar granules may contain vegetable oil.

According to the invention, the caviar granules may contain food coloring matter. For coloring the granules a dark grey color, there may be used as coloring matter the ferric salt of an edible acid, preferably ferric lactate. For coloring the granules a red-orange color, use may be made of animal or vegetable origin coloring matter.

The main body of the caviar of the present invention, should preferably contain vegetable oil such as corn oil or cotton-seed oil. Within the vegetable oil there should be dispersed proteins and flavoring substances; the emulsifying agent for the proteins and flavoring agents may be lecithin. As flavoring for the main body of the caviar codliver oil and herring juice may be used.

The main body of the caviar may also contain, if desired, common salt and preservatives such as sorbic acid. It may also contain sodium glutamate which intensifies the taste and odor of the caviar. It may also contain vitamins and trace elements, e.g. ascorbic acid.

The invention also comprises a method for the preparation of synthetic granular caviar, wherein a solution or suspension of proteins mixed with gelatin is introduced into a liquid immiscible with water, such as vegetable oil, preferably corn oil, or such as a mineral oil, for example pure paraffin oil. The temperature of the oil is kept lower than the melting range of the above-mentioned mixture. The jelly granules formed are washed to remove the oil, and treated with aqueous vegetable tanning extracts.

Also, to the mixture of protein and gelatin there may be added glycerol, which imparts elasticity to the caviar, carbohydrates, preferably starch, dextrin, agar-agar, or pectin which impart mechanical strength to the granulated mixture, and also lipids.

In order to form granules, the solution or suspension of proteins mixed with gelatin is introduced in a stream which breaks up dropwise flowing downward through the layer of oil.

The gelation of the granules is accomplished, according to the invention, by treating the washed jelly-like granules with vegetable tanning agents, for example, with an aqueous extract of pressed tea or green tea.

For coloring the granules a dark grey for example the granules are mixed with an aqueous solution of ferric salts of edible acids, preferably ferric lactate or ferric chloride. The granules are colored an orange-red by an aqueous solution of dyes of animal or vegetable origin. To the colored granules there may be added common salt, sodium glutamate, sorbic and ascorbic acids in order to flavor and preserve the product. To improve fine food value and prevent the caviar from drying out, the colored granules are covered with vegetable oil or an emulsion of a vegetable oil, such as corn oil or cotton-seed oil which contain protein, lecithin, and flavoring agents.

In accordance with the above description in order to prepare 1 kilogram of caviar the following ingredients are required, the quantity of water being omitted.

| Ingredient: | Grams |
|---|---|
| Protein | 40–500 |
| Preferably | 40–250 |
| Gelatin | 20–100 |
| Preferably | 20–70 |
| Carbohydrates | 0–100 |
| Preferably | 10–50 |
| Vegetable oil (lipids) | 50–300 |
| Preferably | 100–150 |
| Common salt | 30–80 |
| Preferably | 35–40 |
| Sodium glutamate | 10–50 |
| Preferably | 10–15 |
| Cod-liver oil | 10–30 |
| Preferably | 15 |
| Lecithin | 0–10 |
| Preferably | 1–2 |
| Sorbic acid | 0.1–2 |
| Preferably about | 1 |
| Ascorbic acid (vitamin C) | 0.1–2 |
| Preferably about | 1 |
| Vegetable tanning agent | 0.1–15 |
| Preferably | 0.1–2 |
| Dyestuffs e.g. ferric salt of an edible acid, or an edible acid, or animal or vegetable coloring matter | 0.1–2 |
| Preferably | 0.1–0.5 |

The present method for the preparation of synthetic granular caviar employs gelatin as a component aside from protein. This component is very important for the production of granules, its use resulting in gel formation. Vegetable tanning agents, for example, an aqueous extract of pressed tea or green tea serves to form a membrane on the surface of the granules.

Cod-liver oil and sodium glutamate impart to synthetic granular caviar flavor and odor close to those of natural caviar.

The present granular caviar very closely resembles the natural caviar of sturgeon, salmon and other fish; the size and shape of the granules also correspond to those of natural granular caviar. The granules of the caviar of the present invention contain all the necessary food constituents and do not deform under a load of 2 to 50 g. per granule. The separate granules and the caviar as a whole have the same consistency, color, sheen, taste and odor as natural granular caviar.

The present method of preparing synthetic granular caviar is described below in detail.

Animal or vegetable proteins, rich in essential amino-acids, for example, casein, and the protein of soya bean, chlorelli, yeast or concentrated broths of food products are dissolved in a suitable solvent such as an aqueous alkaline solution or water. Protein and other food substances may be ground to a colloid state and then an aqueous suspension prepared.

During the preparation of the above solution or suspension, or directly afterwards, there is added the required quantity of gel-forming agent such as gelatin.

To this mixture, there is then added glycerol, lipids, e.g. vegetable oil, carbohydrates, which increase the mechanical strength of the granules, e.g. starch, dextrin, agar-agar, pectin, either separately or in combination.

The mixture obtained in this way is granulated by adding the mixture in a stream which breaks up dropwise, or through a spinneret dropwise, or to a water immiscible medium which may be vegetable oil, e.g. corn oil or cottonseed oil.

Mineral oil also may be used as the water immiscible medium, for example, pure paraffin oil; also a mixture of vegetable and mineral oil may be used.

In order to achieve gelling and to effect movement of the granules by gravity the upper layer of the water immiscible medium is heated to a temperature of 15–40° C., and the lower layer is cooled to a temperature below the gel melting temperature (in the range of 0–20° C.). The granules separated from the above mixture are washed with water acidified to a pH 4–7 in order to free the surface of the granules from oil, to neutralize the alkali and to partly coagulate the casein. The washed granules are treated with aqueous solution of tanning agents, for example, an aqueous extract of pressed tea or green tea (containing tannids), for the formation of a membrane on the surface of the granules.

The tanning process is carried out by adding the granules to the above extract or solution and mixing for the required time which is dependent on the concentration of the tanning agents in the extract or solution and on the desired mechanical strength of the granule membrane. After tanning, the granules are separated from the tanning liquor and washed with water until completely free of said liquor. The granules are then dyed with a food color to the shade required for the product.

For example, for coloring the granules a dark grey in imitation of the color of sturgeon, caviar, the granules are placed in a solution of a ferric salt, such as ferric lactate, and maintained there for the necessary time with continuous mixing. In a similar way the granules may be colored an orange red color in imitation of the color of salmon caviar using animal or vegetable coloring matter.

The dyed granules are washed with water to remove dye residues and are then mixed with common salt, sodium glutamate, sorbic acid, ascorbic acid and cod-liver oil. The latter may be added directly to the vegetable oil which is poured over the granules in order to raise their food value and to prevent them from drying out too quickly. In the vegetable oil there are dispersed proteins and flavoring substances. To the main body of the caviar there is also introduced lecithin, emulsifying proteins and flavoring agents, for example, cod-liver oil.

The protein content may be raised by a partial dehydration after tanning and coloring.

What we claim is:

1. A synthetic granular caviar, wherein said granules comprise a member selected from the group consisting of an aqueous solution and suspension of proteins, gelatin and vegetable tanning agents, said tanning agent being located predominantly in the surface layer of the granules, which surface layer is in the form of a membrane surrounding the aqueous solution or suspension of proteins.

2. A synthetic granular caviar according to claim 1, wherein said granules additionally contain glycerol which imparts elasticity to said granules.

3. A synthetic granular caviar according to claim 1, wherein said granules additionally contain a carbohydrate selected from the group consisting of starch, dextrin, agar-agar, pectins, and mixtures thereof, said carbohydrates imparting mechanical strength to said granules.

4. A synthetic granular caviar which in 1 kg. of final product contains the following constituents, and water:

| Constituent: | Wt. in grams |
|---|---|
| Protein | 40–500 |
| Gelatin | 20–100 |
| Carbohydrate | 0–100 |
| Vegetable oil | 50–300 |
| Common salt | 30–80 |
| Sodium glutamate | 10–50 |
| Cod-liver oil | 10–30 |
| Lecithin | 0–10 |
| Sorbic acid | 0.1–2 |
| Ascorbic acid | 0.1–2 |
| Vegetable tanning agent | 0.1–15 |
| Dyestuffs selected from the group consisting of ferric salts of edible acids, animal and vegetable coloring matter | 0.1–2 | said tanning agent being located predominantly in the surface layer of the granules, which is in the form of a membrane surrounding an aqueous solution or suspension of said protein.

5. A synthetic granular caviar containing in 1 kg. of final product the following constituents and water:

| Constituent: | Wt. in grams |
|---|---|
| Protein | 40–250 |
| Gelatin | 20–70 |
| Carbohydrates | 10–50 |
| Vegetable oil | 100–150 |
| Common salt | 35–40 |
| Sodium glutamate | 10–50 |
| Cod-liver oil | 15 |
| Lecithin | 1–2 |
| Sorbic acid about | 1 |
| Ascorbic acid about | 1 |
| Vegetable tanning agent | 0.1–2 |
| Dyestuffs selected from the group consisting of the ferric salts of edible acids, animal and vegetable coloring matter | 0.1–0.5 | said tanning agent being located predominantly in the surface layer of the granules, which is in the form of a membrane surrounding an aqueous solution or suspension of said protein.

6. A method for the preparation of synthetic granular caviar, comprising providing a member selected from the group consisting of a solution and suspension of edible proteins; mixing said solution with gelatin; adding the mixture obtained in a dropwise stream to a water immiscible liquid, the temperature of the liquid being maintained below the melting temperature of the mixture, washing the jelly-like granules formed to remove the water immiscible liquid, and treating the washed jelly-like granules with an aqueous extract of a vegetable tanning agent.

7. A method according to claim 6 wherein a carbohydrate selected from the group consisting of starch, dextrin, agar-agar, pectin, and mixtures thereof is added to said mixture which imparts mechanical strength to the granules prepared therefrom.

8. A method according to claim 6 in which glycerol is added to said mixture of protein and gelatin to impart elasticity thereto.

9. A method according to claim 6 in which the gel-forming mass is introduced into the water immiscible liquid in a dropwise stream moving from the top to bottom of said liquid.

10. A method according to claim 6 in which the temperature of the upper layer of the water immiscible liquid is maintained at 15 to 40° C. and that of the lower layer at 0–20° C.

References Cited

UNITED STATES PATENTS

| 2,827,376 | 4/1955 | Breuer | 99—3 |
| 3,421,899 | 1/1969 | Humphreys | 99—3 |
| 3,437,488 | 4/1969 | Humphreys | 99—3 |

FOREIGN PATENTS

| 691,694 | 8/1964 | Canada | 99—77 |

A. LOUIS MONACELL, Primary Examiner

R. B. ANDEWELT, Assistant Examiner

U.S. Cl. X.R.

99—1, 3; 260—112